United States Patent [19]

Hill et al.

[11] 3,749,173

[45] July 31, 1973

[54] DISPLACEMENT OF DRILLING FLUIDS FROM BOREHOLES

[75] Inventors: Donald G. Hill; Charles F. Smith; Clare H. Kucera, all of Tulsa, Okla.

[73] Assignee: The Dow Chemical Company, Midland, Mich.

[22] Filed: May 30, 1972

[21] Appl. No.: 257,832

[52] U.S. Cl. .............................. 166/291, 166/294
[51] Int. Cl... E21b 21/00, E21b 33/14, E21b 33/16
[58] Field of Search............... 166/291, 294, 311, 166/312; 175/72, 65; 252/8.5 B, 8.5 C, 8.5 M, 8.5 P, 8.55 R

[56] References Cited
UNITED STATES PATENTS

| | | | |
|---|---|---|---|
| 2,582,909 | 1/1952 | Laurence | 166/291 |
| 2,848,051 | 8/1958 | Williams | 166/291 |
| 3,291,211 | 12/1966 | Savins et al. | 166/312 X |
| 3,411,580 | 11/1968 | McKinney et al. | 166/312 X |
| 3,505,374 | 4/1970 | Monroe | 252/8.55 R X |
| 3,625,286 | 12/1971 | Parker | 166/291 |
| 3,653,441 | 4/1972 | Tuttle | 166/291 |
| 3,688,845 | 9/1972 | Messenger | 166/291 |

*Primary Examiner*—Stephen J. Novosad
*Attorney*—William M. Yates, Bruce M. Kanuch et al.

[57] ABSTRACT

A method is disclosed for displacing drilling muds from boreholes. In the method, an organic liquid, gelled with a metal salt of an aliphatic substituted orthophosphate ester, is pumped into the hole through the casing or annulus to force the drilling mud out through the annulus or casing.

7 Claims, No Drawings

DISPLACEMENT OF DRILLING FLUIDS FROM BOREHOLES

BACKGROUND OF THE INVENTION

It is desirous to remove drilling muds from boreholes, e.g., oil and gas wells, prior to cementing casing therein.

When removing drilling muds from boreholes, e.g., oil and gas wells, it is desirous to employ a spacer or wiper fluid ahead of the cement slurry. It is advantageous that the spacer fluid have the following characteristics. The spacer fluid should have a high viscosity and still be pumpable at normal pumping pressures. High viscosity is necessary to reduce "fingering" of the spacer fluid into the drilling mud and to prevent "fingering" of a driving fluid, e.g., water, oil or a cement slurry, into the spacer or wiper fluid. It is desirous to employ a spacer or wiper fluid which can be quickly prepared at the site of use thereby reducing delays which are costly and which may need to be prevented because of environmental conditions, e.g., freezing temperatures and the like. Therefore, a spacer wiper or fluid which can be prepared within a few minutes is desirable. Also, it is advantageous to employ a spacer or wiper fluid having an initial high viscosity which can be broken (i.e., viscosity greatly reduced) after its usefulness is completed. This enables the user to more easily dispose of the spacer or wiper fluid. It is also, in many instances, desirable to use non-aqueous fluids, e.g., organic liquids which are available at the use site, e.g., kerosene, diesel oils, some crude oils and the like. When drilling muds are to be removed from boreholes where freezing temperatures are encountered, e.g., where permafrost is incurred, it is desirous that the spacer fluid have a low thermal conductivity and a low freezing point. Further, since it is often desirous to match the weight of the spacer or wiper fluid to that of the drilling fluid, and/or driving fluid, e.g., a cement slurry, the spacer or wiper fluid should have sufficient gel strength to support various weighing agents therein, e.g., barite, etc.

The present invention concerns a method of displacing a drilling fluid (mud) from a borehole employing a unique gelled organic liquid processing many of the foregoing desired characteristics.

SUMMARY OF THE INVENTION

The invention concerns a method of displacing a drilling fluid from a borehole containing a casing. In the method, the drilling mud is displaced from the borehole by driving a spacer fluid of an organic liquid gelled with a metal salt of an aliphatic substituted orthophosphate through the hole.

The gelled organic liquid does not affect water sensitive formations; it can be broken by chemical action; it has low formation damage properties; the viscosity of the gel remains almost constant over a wide temperature range, fluid-loss control can be obtained economically, and the system has excellent weighing agent carrying capacity.

DETAILED DESCRIPTION OF THE INVENTION

The spacer fluid employed in the invention is prepared by gelling an organic liquid with a gelling quantity of a metal salt of an aliphatic substituted orthophosphate ester. Salts which can be employed include, for example, those aliphatic substituted esters and their method of preparation taught in U.S. Pat. Nos. 2,983,678; 3,494,949 and 3,505,374. These esters are taught to be useful viscosity improving agents, gelling agents, thickeners, and the like, for various organic liquids. The teachings of these patents are specifically incorporated herein by reference. Aluminum, iron, chromium, zirconium, titanium, tin, mercury and rare earth metal salts of aliphatic substituted orthophosphate esters can be employed.

The aluminum aliphatic orthophosphate esters are preferred gelling agents for organic or oil-base liquids employed in the practice of the invention.

The alkyl groups of the alkyl ester are preferably selected from, for example, methyl, ethyl, propyl, isopropyl, isobutyl, t-butyl, butyl, amyl, hexyl, octyl (caprylyl), nonyl, decyl, undecyl, dodecyl (aluryl), tridecyl, tetradecyl (myristyl), pentadecyl, hexadecyl, heptadecyl, octadecyl (stearyl), nonadecyl, eicosyl, and, as aforesaid, combinations of straight and branched chain alkyls within the same molecule and mixtures of various straight and branched chain dialkyls. They also include the corresponding unsaturated straight and branched chain aliphatics, viz., alkenyls and alkynyls. Compounds corresponding to the formula

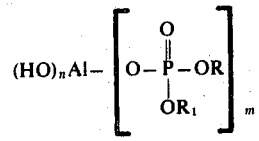

wherein $n = 2$ to 0, $m = 1$ to 3, and $n + m$ is equal to 3, and wherein R and $R_1$ are independently $C_1$ to $C_{20}$ alkyls, or $C_3$ to $C_{20}$ alkynyls can be employed. Also R or $R_1$, but not both, may be H. The aluminum salt of any combination of these esters may be employed as the gelling agent for the organic or oil-base liquid. When $n$ is zero, the orthophosphate group integer "$m$" is 3 and when $n$ is 2, $m$ is 1. Any arithmetical value above zero but not more than 3 is an average and may be 1.25 or 2.4 or the like for the orthophosphate group. Specific salts, illustrative only, of the type required to be used in the practice of the invention, are: aluminum salt of methyl tetradecylorthophosphoric acid ester, aluminum salt of methyldodecylorthophosphoric acid ester, aluminum salt of alkenyloctylorthophosphoric acid ester, or aluminum salt of propynyldecynylorthophosphoric acid ester. For ease of expression, the aliphatic-substituted aluminum orthophosphate may often be referred to merely as the alkyl ester or salt, although it is understood that the unsaturated hydrocarbon radicals are included.

The aluminum salt of aliphatic orthophosphate ester can be prepared by any suitable procedure known in the art. One such procedure is described in *Industrial and Engineering Chemistry*, Vol. 34, page 20 et seq (1942); in *Chemical Industries*, Vol. 4, page 516 et seq (1942); in U. S. Pat. No. 3,494,949 and the like.

The procedure for preparing the alkyl esters generally requires reacting an orthophosphoric acid ester (e.g., prepared by reacting a selected alcohol or mixture of alcohols with a phosphorous compound such as phosphorous pentoxide, phosphorous oxychloride, $PCl_5$, $PF_5$, etc.) with a basic metal compound. Suitable basic aluminum compounds include, for example, sodium aluminate, aluminum isopropoxide, hydrated alumina or the like. Other metal compounds include, for example, magnetite, basic chromium chlorides, basic iron chlorides and the like.

The metal salt of the orthophosphate ester, e.g., an aluminum salt, as described above, may be admixed with the organic liquid in any convenient manner. For example, the additament at either full strength, or more usually diluted by kerosene or the like, may be bled at a controlled or gauged rate into a transfer line or into a pump employed in the operation or by both techniques or it may be admixed in a storage vessel prior to its entrance into the tubing, lines, or the like.

The recommended procedure to follow is to gel an organic liquid with from about 0.5 and 400 pounds by weight of a metal, preferably aluminum, alkyl- or alkenylorthophosphate per 1,000 gallons of the liquid, e.g., gasoline, oil, diesel oil, crude oil or kerosene. An amount of the ester which is sufficient to prepare a gelled organic liquid having the desired viscosity and weighing agent carrying capacity is employed.

It has been found that maximum gel strength depends not only upon the amount of aluminum salt present but when an organic liquid is gelled by separately adding an aluminum compound and an ester, also upon the weight ratio of the reactants. The preferred ratios for any given reactants can be readily determined by simple laboratory procedures wherein the total amount used and the ratio of the specific reactants are varied until a specific viscosity or maximum viscosity is achieved in a specific organic liquid. Generally, it is preferred to match the viscosity of the spacer fluid to that of the drilling mud. However, when a cement slurry is employed it is preferred to match or exceed the weight (i.e., density, e.g., lbs/gal) of the spacer fluid with the cement slurry to minimize fingering and possible contamination of the cement slurry which can cause premature setting of the cement and plugging of the borehole.

Organic liquids which can be employed are generally non-polar and include, for example, aliphatic and aromatic hydrocarbons, and mixtures thereof, refined paraffinic oils, e.g., lubricating oils, kerosene, diesel oils, some crude oils, mixtures of these and the like. The effectiveness of any particular metal salt in any specific organic liquid should be determined prior to a large scale operation.

If desired, the viscosity of the gelled spacer liquid may be automatically reduced (i.e. broken) by the addition of an appropriate gel breaker which functions slowly to break the gel in 4-48 hours. Suitable gel breakers include, for example, calcium hydroxide, sodium phosphate, certain ammonium carbonates and aliphatic amines.

In practicing the invention, usual pumping equipment and the general layout conventionally employed, other than the admixture of the selected metal alkylorthophosphate, may be employed to displace a drilling fluid from a well. Generally, the mud is displaced from the well by pumping the spacer fluid, and if desired a driving fluid (e.g., water, oil, cement slurry) behind the spacer fluid, through conduits, e.g., casing or tubing, and forcing the mud up and out of the annulus between the conduit and the formation. If desired, the mud may be displaced out through the conduit by pumping the spacer fluid down through the annulus.

Particular gelling agents which can be employed in the invention can be prepared as follows:

Preparation of methyldodecylorthophosphoric acid ester:

The equipment consists of a 2-liter round-bottom flask equipped with a mechanical stirrer, reflux condenser, dropping funnel and thermometer.

A total of 400 milliliters of dry hexane is placed in the 2-liter flask, then 142 grams (1 mole) of $P_2O_5$ are added and stirred to form a slurry.

Three hundred seventy-two grams (2 moles) of dodecyl alcohol and 64 grams (2 moles) of methyl alcohol are mixed together and added via dropping funnel to the hexane and $P_2O_5$ slurry with rapid stirring. Cooling is required to keep the reaction temperature below 40°C.

After the alcohols have been added, the reaction mixture is heated to and maintained at a temperature such that the hexane will reflux for one hour.

The hexane is thereafter removed by distillation, the last traces being removed under a reduced pressure reading of 100 millimeters mercury.

A method for the preparation of aluminum salt of methyldodecylorthophosphoric acid ester, comprises:

Admixing in a 2-liter flask equipped with a mechanical stirrer and thermometer 700 milliliters of water and 200 milliliters ethanol. NaOH (19.8 grams), dissolved in 100 milliliters of water, are added to the water and ethanol mixture. Methyldodecylorthophosphoric acid ester (140 grams) are added and mixed well. A solution of 82 grams of $Al_2(SO_4)_3 \cdot 18H_2O$, dissolved in 100 milliliters water, is added accompanied by rapid agitation. The finely dispersed precipitate is thereafter filtered and washed with water. The filtered and washed precipitate is dried under mild temperature under at least a partial vacuum.

A method for the preparation of ethyltetradecylorthophosphoric acid ester comprises admixing 90 milliliters of ethyl alcohol and 332 grams of tetradecyl alcohol in a 1-liter flask equipped with a mechanical stirrer and thermometer. The alcohols are heated while stirred to approximately 50°C to melt the tetradecyl alcohol. The alcohols are then mixed together.

Very slowly and cautiously 110 grams of dry phosphorus pentoxide ($P_2O_5$) are added directly to the mixture of alcohols contained in the flask. Stirring is maintained at a rate adequate to disperse, with a minimum delay, the $P_2O_5$ into the alcohols. Cooling may be necessary. Temperature should not be allowed to exceed 80°C. After all the $P_2O_5$ has been added, the materials in the flask are heated if necessary to 80°C and held thereat for one hour.

A method for the preparation of ethyltetradecylorthophosphoric acid ester comprises admixing 90 milliliters of ethyl alcohol and 332 grams of tetradecyl alcohol in a 1-liter flask equipped with a mechanical stirrer and thermometer. The alcohols are heated, while stirred, to approximately 50°C to melt the tetradecyl alcohol. The alcohols are then mixed well together.

Very slowly and cautiously 110 grams of dry phosphorus pentoxide ($P_2O_5$) are added directly to the mixture of alcohols contained in the flask. Stirring is maintained at a rate adequate to disperse with a minimum delay the $P_2O_5$ into the alcohols. Cooling may be necessary. Temperature should not be allowed to exceed 80°C. After all the $P_2O_5$ has been added, the materials in the flask are heated if necessary to 80°C and held thereat for 1 hour.

This reaction product may be diluted with 50-5000 ml fluid hydrocarbon and activated by admixing 1.05 grams of sodium aluminate (38 percent in aqueous solution). Viscosity with subsequent friction reduction is noted when reaction product concentration approaches 0.5 percent by volume in the hydrocarbon carrier. To achieve gellation of a hydrocarbon fluid for use in the practice of the invention, a higher concentration of reaction product is required. In most instances, the gelling quantity of reaction product required for a refined oil containing no additives is less than the gelling quantity required for a crude oil.

A total of 36,000 gallons of gelled kerosene is prepared as follows: To the kerosene is added 777 pounds of ethyl dodecyl orthophosphate. Immediately prior to injecting the kerosene into a well, 60 gallons of an aqueous solution containing 38 percent (by weight) of sodium aluminate is added to attain friction reducing properties and to gel the 36,000 gallons of kerosene. The gel viscosity is about 900 centipoise, as measured on a Brookfield LVF viscosimeter with No. 3 spindle at 60 rpm. The gelled kerosene can be pumped at a rate of about 14.0 bpm down the 2½ inch (i.d.) tubing. The maximum pump rate for kerosene without this additive would be 9 bpm at the 6900 psi pressure limit imposed by the well operator.

In the above treatment, the kerosene and friction reducing and gelling additives were batch mixed prior to injection of the gelled fluid and suspended sand into the 2.5 inch tubing. The gel was observed to develop within a few minutes after addition of the gelling components. In batch mixing, the alkyl orthophosphate ester and the aqueous sodium aluminate solution can be added simultaneously but prior to addition to the hydrocarbon to be gelled, these reactants must be kept separated and not allowed to premix. If desired, the hydrocarbon fluid, the alkyl orthophosphate ester and sodium aluminate may be continuously mixed rather than batch mixed. To obtain optimum results through continuous mixing, special equipment should be used.

EXAMPLE

In this example a test well 6½ inches in diameter and 60 feet deep contained 2 inch tubing. The well was filled with 110 gallons of an aqueous based drilling mud. A gelled spacer (wiper) fluid of the invention was prepared by adding simultaneously 25 gallons of a mixed alkyl orthophosphate ester containing alkyl groups of ethyl, octyl, decyl and dodecyl, and 3.7 gallons of a sodium aluminate aqueous solution (38 percent by weight active) to 1000 gallons of Artic grade diesel oil. The 110 gallons of drilling mud was displaced by pumping 90 gallons of the gelled oil down through the tubing and forcing the mud up through the annulus. The gelled spacer fluid was driven from the tubing by a grease type casing pack commonly used to fill the annulus between a casing pipe and frozen permafrost regions. Substantially all the mud and gelled oil spacer fluid were displaced from the hole.

The spacer fluid of the present invention is especially suited for use in frozen permafrost regions where a non-freezing fluid is required.

Because of the characteristics of the organic gel it may be left in the borehole as a packer fluid following the removal of a drilling mud therefrom.

What is claimed is:

1. In the method of cementing casing into a well bore wherein a drilling mud, which remains in the bore following the drilling thereof, is removed by displacing the mud with a second fluid, the improvement comprising:
   a. placing into the well bore and in contact with said drilling mud an organic liquid which is gelled with a metal salt of an alkyl orthophosphate ester, and
   b. displacing said drilling mud and gelled organic liquid from the bore with a driving fluid.

2. The method of claim 1 wherein said organic liquid has a viscosity about equal to or greater than the viscosity of the drilling mud.

3. The method of claim 1 wherein said organic liquid is gelled with an aluminum salt of an alkyl orthophosphate ester.

4. The method of claim 1 wherein said driving fluid comprises a hydraulic cement slurry employed to cement said casing into said well bore.

5. The method of claim 4 wherein the density of the gelled organic liquid is about equal to the density of the hydraulic cement slurry.

6. The method of claim 1 wherein the drilling mud and gelled organic liquid are displaced from the well bore through the annulus space existing between the casing and the well bore.

7. In the method of removing a drilling fluid from, and packing a borehole the improvement which comprises:
   a. placing into the well bore and in contact with said drilling fluid an organic liquid which is gelled with a metal salt of an alkyl orthophosphate ester;
   b. displacing said drilling fluid from the borehole; and
   c. packing the borehole with said gelled organic liquid.

* * * * *